United States Patent
Sen

(10) Patent No.: US 6,796,322 B2
(45) Date of Patent: Sep. 28, 2004

(54) HYDRAULIC PRESSURE REGULATING VALVE

(75) Inventor: Mehmet-Faith Sen, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/067,069

(22) Filed: Feb. 4, 2002

(65) Prior Publication Data
US 2002/0104572 A1 Aug. 8, 2002

(30) Foreign Application Priority Data
Feb. 2, 2001 (DE) .......................................... 101 04 622

(51) Int. Cl.$^7$ ............................................. F15B 13/044
(52) U.S. Cl. ...................... 137/82; 137/625.65; 251/50; 251/129.17
(58) Field of Search ............................... 137/82, 625.65; 251/50, 129.17

(56) References Cited
U.S. PATENT DOCUMENTS 5,447,288 A 9/1995 Keuerleber et al.
5,984,259 A * 11/1999 Najmolhoda et al. ......... 251/50

\* cited by examiner

Primary Examiner—Gerald A. Michalsky
(74) Attorney, Agent, or Firm—Michael J. Striker

(57) ABSTRACT

A hydraulic pressure regulating valve for regulating a pressure in an automatic transmission of a motor vehicle, comprising a magnetic part which includes an electrically controllable coil, a coil core and a movable armature, a valve flange which is anchored on the magnetic part and has pressure medium guiding passages, a piston controlling a pressure in a passage connected to a consumer, the piston being loaded with the armature and controlling pressure medium connections between the passages, a diaphragm element which seals the valve flange relative to the magnetic part, a return passage, the diaphragm element having at least one pressure chamber which is hydraulically connected with the return passage, and a throttling device formed so that the pressure chamber is connected with the return passage through the throttling device.

12 Claims, 3 Drawing Sheets

HYDRAULIC PRESSURE REGULATING VALVE

BACKGROUND OF THE INVENTION

The present invention relates to hydraulic pressure regulating valves.

Pressure regulating valves are used for example in hydraulic controls of automatic transmissions of motor vehicles. Their objective is to control transmission components such as for example couplings and to regulate their pressures.

A hydraulic pressure regulating valve is disclosed for example in the German patent document DE 43 24 748 A1. This pressure regulating valve is composed of a magnetic part and a valve flange which is anchored on it. The magnetic part includes an electrically controllable coil, a coil core and a movably guided armature which is held by a spring in the base position. The armature actuates a piston which is guided movably in the valve flange and which for regulation of the pressure releases or closes pressure medium connections between passages. The valve flange is sealed from the magnetic part by a diaphragm element. The latter is ring-shaped and fixed with its outer periphery on the valve body and with its inner periphery on the piston. The diaphragm element thereby follows the movement of the piston. In order to avoid a pressure buildup in an inner chamber of the diaphragm element, the rubber chamber is connected with the return of the pressure regulating valve.

The armature movement of the pressure regulating valve is performed undampened. Thereby the pressure regulating valve is relatively sensitive to mechanical vibrations of the magnetic circuit or pressure fluctuations of the pressure regulating circuit. For many applications such undampened regulating condition is undesirable. In known pressure regulating valves, a dampening of the stroke movement of the piston can be performed with the use of separate dampening devices, for example a so-called spring accumulator. Such dampening devices have the disadvantages of their large mounting space, unfavorable dynamics, and relatively high costs.

It is also known to dampen the stroke movement of the piston in a pressure regulating valve via so-called gap dampening in the magnetic part. For this purpose the magnetic part, in contrast to the solution disclosed in the German reference DE 43 24 748 A1, is filled with pressure medium. The gap between the armature and the wall of the armature chamber and/or throttling openings in the armature form throttling elements for dampening of the medium stream which is displaced by the armature during its movement and thereby also the piston movement. A substantial disadvantage of the dampening of this type is on the one hand its dependence on the filling degree of the armature chamber with pressure medium, and on the other hand its temperature dependence because of the laminar stream which is formed in the relatively long throttle gaps. A further problem resides in entrainment of dust particles into the armature chamber which is filled with a pressure medium. These impurities negatively influence the magnetic characteristics of the pressure regulating valve, can cause wear of the components of the magnet parts or can deposit in the dampening gaps.

SUMMARY OF THE INVENTION

Accordingly, it is an object of the present invention to provide a hydraulic pressure regulating valve, which avoids the disadvantages of the prior art.

In keeping with these objects and with others which will become apparent herein after, one feature of the present invention resides, briefly stated, in a pressure regulating valve has a magnetic part which includes an electrically controllable coil, a coil core and a movable armature; a valve flange which is anchored on said magnetic part and has pressure medium guiding passages; a piston controlling a pressure in a passage connected to a consumer, said piston being loaded with said armature and controlling pressure medium connections between said passages; a diaphragm element which seals said valve flange relative to said magnetic part; means forming a return passage, said diaphragm element having at least one pressure chamber which is hydraulically connected with said return passage; and a throttling device formed so that said pressure chamber is connected with said return passage through said throttling device.

When the pressure regulating valve is designed in accordance with the present invention, a dampening device is integrated in the pressure regulating valve and does not change significantly the mounting volume of the valve and also does not require any filling of the magnetic part with pressure medium. The risk of emptying of the armature chamber, for example during transportation of the pressure regulating valve to consumers, is thereby prevented, and also a possible dirtying of the armature chamber during the operational time. In addition the required structural features of the components are manufactured in cost-favorable manner.

In accordance with the present invention it is especially advantageous when the guidance of a piston in the valve flange for forming of the damping device is utilized. This throttle device can be easily adjusted to corresponding requirements of the applications for the pressure regulating valve, by varying the gap dimension or the piston guide with recesses of different geometries and/or dimensions.

In an advantageous further embodiment of the invention, the magnetic part is formed as a proportional magnet, in which the armature is inserted at least partially into the interior of the magnetic core. Pressure regulating proportional magnetic valves have a very exact and accurate control of nominal pressure values, without requiring an expensive pressure regulating circuit. Thereby such pressure regulating valves are especially suitable for applications in of mass production, such as for example in the automobile industry.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1a, 1b and 2 show embodiments of a pressure regulating valve in accordance with the present invention in a longitudinal cross-section, with pressure regulating valves in FIGS. 1a and 1b formed as a 3/2 pressure regulating valve with a falling pressure/flow characteristic line in a slider construction, with two different throttling devices, while FIG. 2 shows a pressure regulating valve in a seat construction.

DESCRIPTION OF THE PREFERRED EMBODIMENTS

Figure 1A:
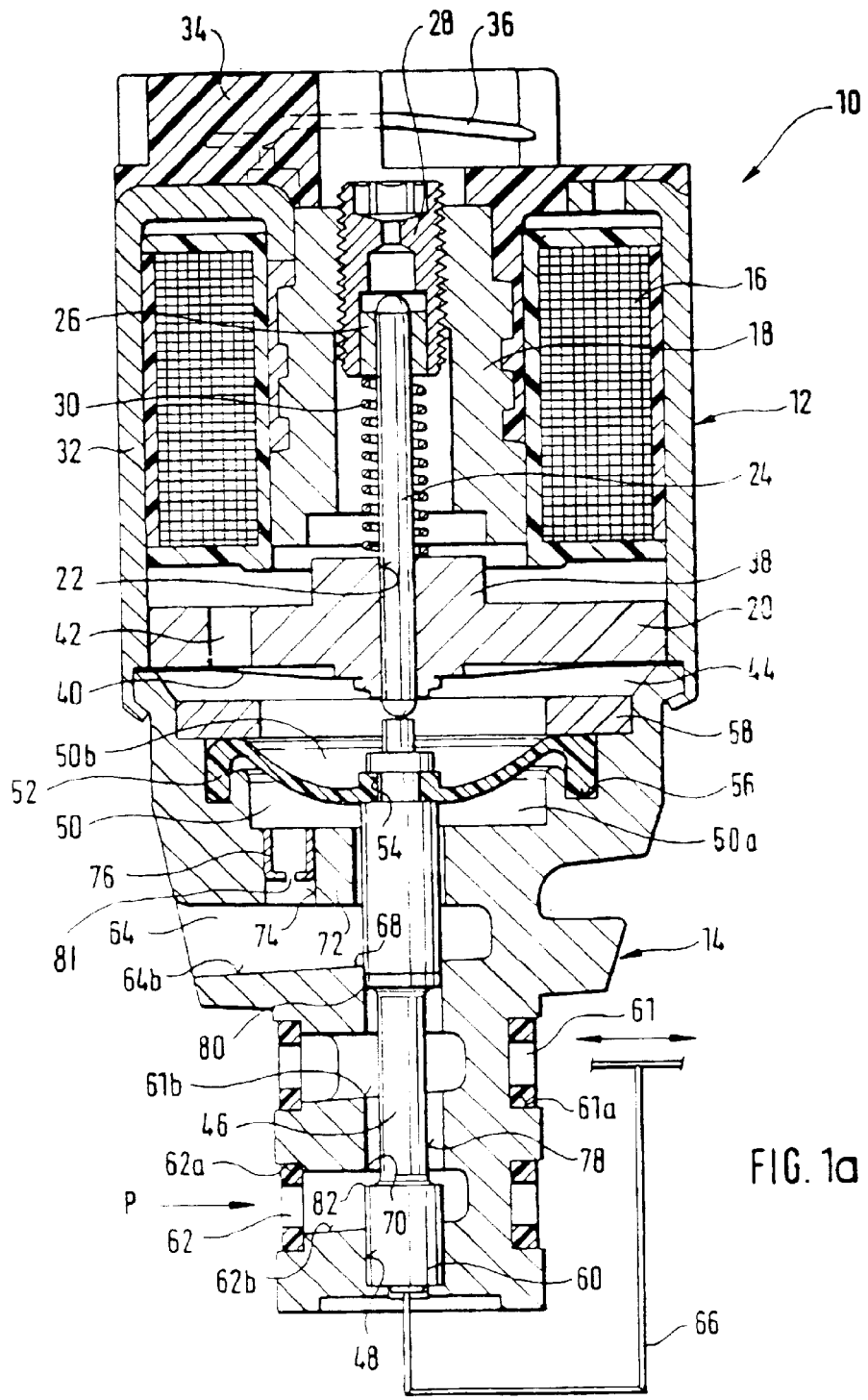
Figure 1B:
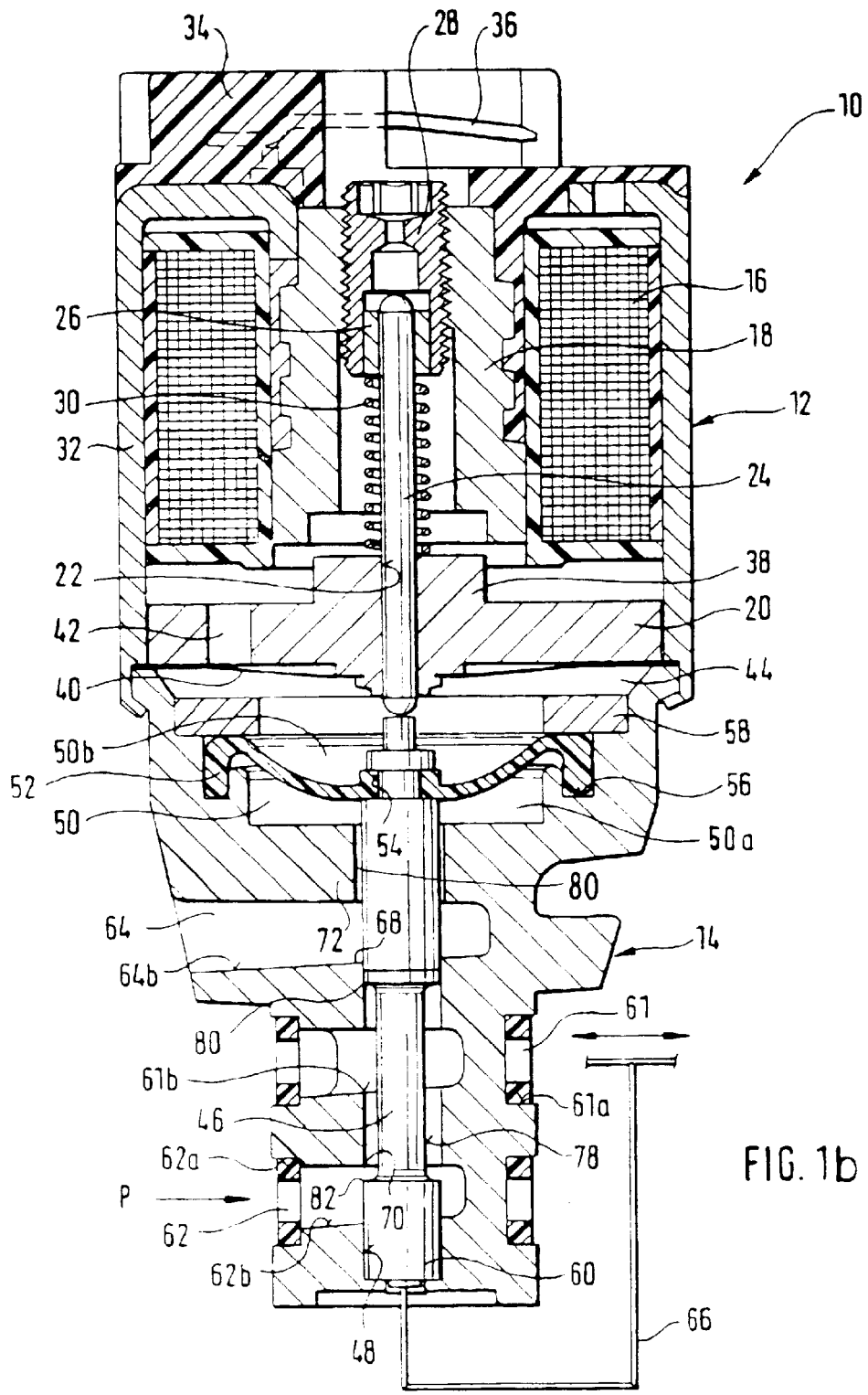

A pressure regulating valve in accordance with the present invention is shown in FIGS. 1a and 1b and identified with reference numeral 10. It has a magnetic part 12 and a valve flange 14 which is connected to the latter. The magnetic part 12 includes a hollow-cylindrical coil 16, a sleeve-shaped coil core arranged in the interior of the coil 16, and a movably guided armature 20. The latter is arranged at the end side of the coil 16 which faces the valve flange 14 and overlaps it.

For its axial guidance, the armature 20 has a pin 24 which is mounted in a central opening 22 extending through the armature. It extends into a sliding bushing 26 which is anchored in the coil core 18. The sliding bushing 26 is inserted in a blind hole-shaped recess of a plug 28 which is screwed in the sleeve-shaped coil core 18 and closes the same from outside. The plug 28 is changeable in its relative position relative to the coil core 18. A spring 30 which is centered by the pin 22 is supported on it. With its second end it abuts against the armature 20. The pre-tensioning of the spring 30 is adjustable via the relative position of the plug 28 relative to the coil core 18 during the mounting of the pressure regulating valve. The function of the spring 30 is to provide a restoring force which brings the armature 20 in powerless condition of the coil 60 to the illustrated base position of the pressure regulating valve 10.

The magnetic part 12 is injection-molded with a synthetic plastic casing 34 with embedding of an element 32 which conducts the magnetic flux. Contact tongues 36 extend outwardly from the synthetic plastic casing 34. Electrical contacting of the coil 16 with a not shown control electronic system is provided through the contact tongues 36.

The armature 20 of the magnetic circuit is disc-shaped and has a central portion 38 with a reduced outer diameter. It extends in direction of the coil 16 and also in direction of the valve flange 13. An elastic guiding disc 40 is anchored at the end of the central portion 38 which faces the valve flange. It is fixed with its outer periphery with a magnetic flux conducting element 32 and the valve flange 14. The guiding disc 40 together with the pin 22 guarantees the exact guidance of the armature 20.

The armature 20 moreover is provided with throughgoing openings 42 in the region between its outer diameter and the diameter of the central portion 38. One of such openings is shown in FIGS. 1a, 1b. The throughgoing openings 42 are distributed uniformly around the circumference of the armature and connect the part of the armature chamber 44 located about the armature 20 with its part located below. Identical conditions which are thereby provided in the both parts of the armature chamber 44 guarantee the undampened movement of the armature 20.

It should be mentioned that the above shown design of the magnetic part 12 is purely exemplary and is not limiting for the scope of the present invention. The design of the magnetic part 12 as such does not constitute the inventive features. Any other magnetic circuit design or armature support which can not be provided for the realization of the invention can be utilized. For the operation of the invention an undamped movement of the armature 20 in the magnetic part 12 must be however guaranteed.

The armature 20 cooperates with the piston 46 which is guided in the valve flange 14 in a force-transmitting manner. For this purpose the valve flange 14 is formed for example as a pressure cast part which is flanged in the magnetic part 12. The valve flange 14 is provided with a guiding opening 44 which extends in direction of its longitudinal axis and receives the piston 46. The guiding opening 44 opens at the end of the valve flange 14 which faces the magnet, into an opening 56 which opens toward the magnetic part 12. The recess 50 is expanded in its diameter relative to the guiding opening 48 and forms a mounting space for a diaphragm element 52.

The diaphragm element 52 separates the recess 50 in two pressure chambers 50a and 50b which are separated from one another and seals the magnetic part 20 relative to the valve part 14. For this purpose the diaphragm element 52 is ring-shaped and is mounted on its diameter in a slot 54 on the periphery of the piston 46. The outer diameter of the diaphragm element 52 is received in a groove 56 which is formed on the valve flange 14. It is fixed there by a holding ring 58 which is clamped in the recess 50. The diaphragm element 52 has such dimensions that it can follow an axial movement of the piston 46 within the control of the coil 16.

The hydraulic connections 61, 62, 64, of the pressure regulating valve 4 are formed on the valve flange 14. A not shown hydraulic consumer is connected with the connection 61, which in the preferable embodiment of the pressure regulating valve 10, is a following valve over a coupling. The connection 62 is connected with a not shown pressure generator and acts as a supply of the pressure regulating valve 10. The connection 64 is connected with a not shown pressure medium supply container and acts as a return. Moreover, a contact connection 64 schematically shown in FIGS. 1a, 1b is provided between the connection 61 at the side of the consumer and a connection 60 at the end of the guiding opening 48 which is opposite to the magnetic part 12. The end surface of the piston 46 is loaded with a working pressure through the connection 60, to guarantee its abutment against the armature 20.

The connection 61 is formed as a ring groove 61a on the periphery of the valve flange 14 and opens through a radially extending working passage 61b into the guiding opening 48. Therefore the opening section of a first control cross-section 68 is formed. The connection 62 is arranged between the connection 60 and 61 on the pressure regulating valve 10. It is also formed as a ring groove 62a and is connected through radial supply passages 62b with the guiding opening 48. Therefore this opening part forms the second control cross-section 70 of the pressure regulating valve 10.

A return-side connection 64 is provided in direction of the magnetic part 12 above the connection 61 of the pressure regulating valve 10. It opens through a return passage 64b into the guiding opening 48. For the operation of the above described pressure regulating valve 10 it is important that the connection 64 is located deeper than the pressure medium level in the connected supply container since only in this way the return passage 64b is reliably filled with pressure medium under low pressure.

The passages 61b, 62b, and 64b of the pressure regulating valve 10 through which the pressure medium flows are separated by a wall 72 from the pressure chamber 50a. However, a connecting opening 74 is provided in the valve 72 and couples the pressure chamber 50a hydraulically with the return passage 64b. Thereby the pressure chamber 50a is always filled with pressure medium. As shown in FIG. 1a, a throttling device 76 is anchored in accordance with the present invention in the connecting opening 74. In the shown example it is integrated in a separate hat orifice. The hat orifice is pressed with its circumferential edge up to the abutment in the connecting opening 74. It has at least one orifice opening 81 at its part which covers the cross-section of the connecting opening 74. With dimensioning of the cross-section of the orifice opening by the material thickness of the hat orifice, the latter can be formed in a simple way as an ideal orifice in accordance with a flow technique. The dampening characteristic of ideal orifices is preferably, in the temperature region under consideration, substantially independent from temperature changes.

A narrowing 78 is provided in the substantially cylindrical piston 46 for controlling the pressure of the connection 61 of the pressure regulating valve 10 which is connected to the consumer. At the beginning and at the end of the narrowing 78, two control edges 80, 82 are formed on the piston 46. They cooperate in alternating action with both control cross-sections 68 and 70 of the valve flange 14. In the shown base position of the pressure regulating valve 10 the second control valve 82 which is located facing away from the magnetic part 12 releases a pressure medium connection between the connection 61 associated with a consumer and the connection 62 of the valve flange 14 associated with a supply. Simultaneously the first control edge 80 of the piston 46 closes the pressure medium connection between the consumer-side connection 61 and the return-side connection 64 of the pressure regulating valve. The consumer is thereby supplied from the pressure generator with pressure medium until the required working pressure is built up and the control edge 82 no longer closes.

With the electrical control of the coil 16, the armature 20 is moved due to the produced magnetic force against the restoring force of the spring 30 in direction of the coil 16. The piston 46 follows because of the loading of its end surface which faces away from the magnetic part 12 with the working pressure of this stroke movement. The free flow cross-section between the control cross-section 68 and the control edge 80 opens, so that the pressure at the consumer-side connection 61 of the pressure regulating valve 12 reduces, until finally the piston 46 completely interrupts the pressure medium connection.

Due to the anchoring at the piston 46, the diaphragm element 52 follows the stroke movement of the piston. The volumes of the pressure chambers 50a and 50b which are separated from one another by the diaphragm element 52 change. With corresponding movement direction of the piston 46 the pressure medium is displaced by the diaphragm element 52 through the connecting opening 74 with the inserted throttling device 66 into the return 64. The diaphragm element 52 performs in addition to its sealing function also a pumping function. The throttling action produced by the throttling device 76 in the connection passage 34 maintains, depending on the speed, the stroke movement of the piston 46 and acts in a stabilizing way on the regulating properties of the pressure regulating valve 10. Short-term pressure fluctuations in the pressure regulating circuit, for example mechanically caused vibrations in the magnetic circuit 12 which are transmitted through the armature 20 to the piston 46 remain due to the dampening properties without influencing the pressure level at the consumer.

An adaptation of the dampening properties to the corresponding applications of the pressure regulating valve 10 is performed by the number of the throttling devices 76, their geometrical construction and/or dimensions.

It is to be understood that it is also possible to dispense with the connecting passage 74 with the inserted throttling device 76, and to provide between the piston 46 and the wall of its guiding opening 48 in the region between the pressure chamber 50a and the return passage 64b a gap 80 as the throttling device 76, as shown in FIG. 1b. Regardless of this it is advantageous when the connecting passage 74 is formed as the throttle device 76 and therefore a separate hat orifice can be dispensed with. In order to exclude the temperature dependency of the throttling condition, the throttle device 76 can be formed so that in the throttle gap a turbulent stream is introduced. It is achieved with so-called ideal orifices, whose length/diameter ratio is maintained in a predetermined value. Furthermore, it is also proposed in the case of the formation of the throttling device 76 in the connecting passage 74, to design the gap between the piston 46 and its guiding opening 48 in the region between the pressure chamber 50a and the return passage 64b so that, a pressure medium leakage from the pressure chamber 50a via the gap is excluded. This is achieved through the absolute gap dimension and a correspondingly determined gap length.

Figure 2:
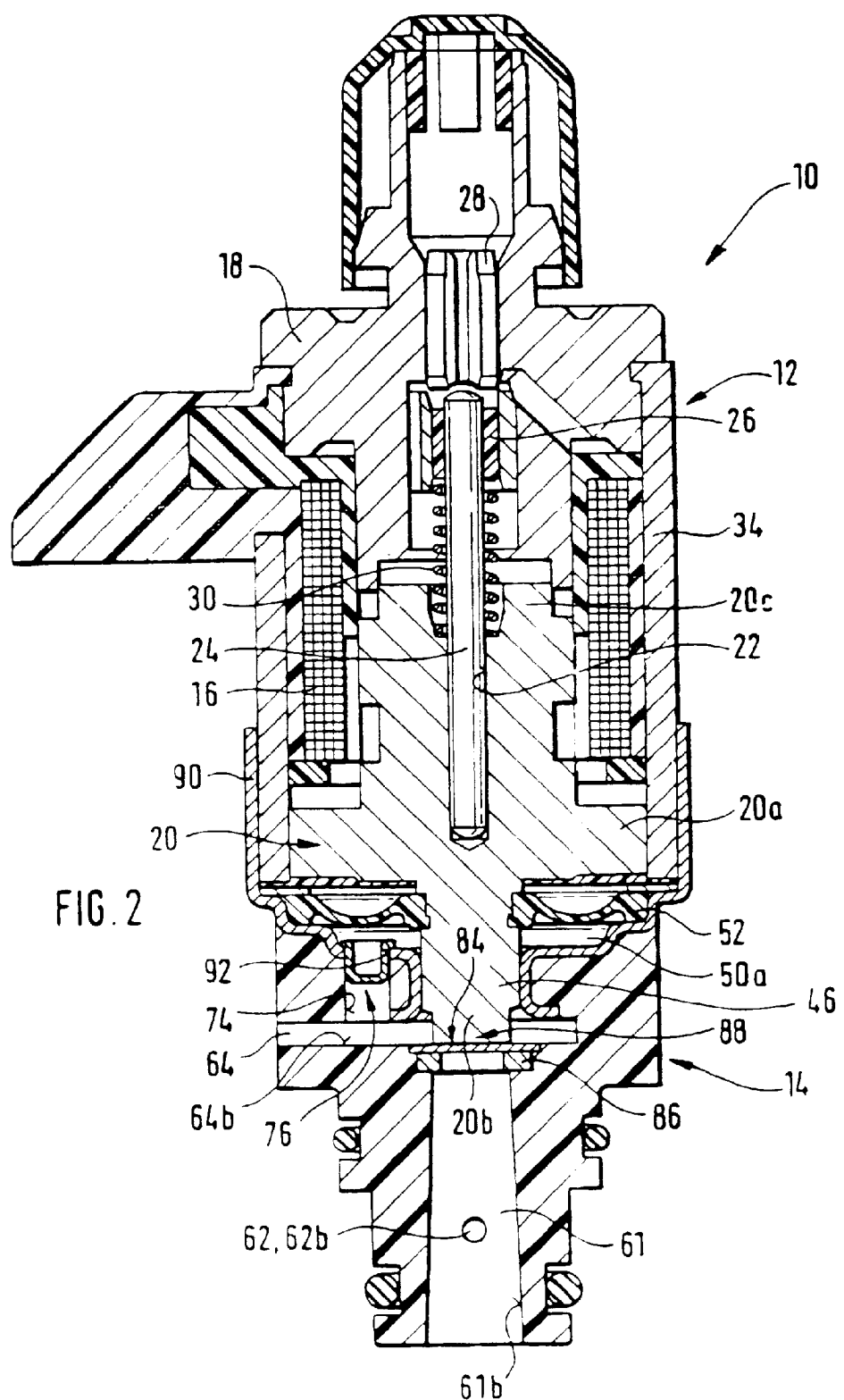

FIG. 2 shows a second embodiment of an inventive pressure regulating valve 10 with integrated dampening device. Components which are functionally identical to those shown in the preceding figures are identified with the same reference numerals. The pressure regulating valve 10 of FIG. 2, in contrast to the pressure regulating valve of FIG. 1, is formed as a so-called flat seat pressure regulator. It has a valve flange 14 with three hydraulic connections 61, 62 and 64. The working passage-side connection 61 of the pressure regulating valve 10 is now connected with the return-side connection 64 through a valve seat 84. The third, supply-side connection 62 is arranged between the connection 61 and 64. It extends perpendicularly to the plane of the drawings, so that in FIG. 2 only its opening cross-section into the working passage 61b is recognizable. The connection 64 merges into the return passage 64b and opens into the working passage 61b, while it is located at the opening point of the valve seat 84. It is designed in form of metallic seat plate 86, which is injection molded in the valve flange 14. In the shown base position the valve seat 84 of the pressure regulating valve 10 is closed by a closing member 88. The closing member 88 in this case is formed of one piece with the armature 20.

The valve flange 14 is formed as a synthetic plastic injection molded component, and a sleeve-shaped deep drawn part 90 locally is surrounded by this synthetic plastic injection molded component. The deep drawn part 90 extends outwardly beyond the valve flange 14 and with its outwardly extending end locally engages the magnetic part 12. Moreover, a throughgoing passage 92 is provided on the deep drawn part 90 in the region of its portion which is surrounded by the valve flange 14. The throttling device 76 in form of a hat orifice with at least one orifice opening which is not shown in FIG. 2 is inserted in the throughgoing opening 92. The throttling device 76 is located also in a connecting passage 74 of the valve flange 14, between the return passage 64b and the pressure chamber 50a which is limited by the diaphragm element 52.

The deep drawn part 90 is injection molded only on the outer side of its inserted end. Its inner side is free from synthetic plastic and forms a guide for the part of the armature 20 which forms the valve piston. With respect to its dampening properties, the second embodiment is identical to the first embodiment, so that the corresponding explanations are dispensed with.

It should be mentioned that in the second embodiment the coil core 18 and the armature 20 of the magnetic part 12 extend locally into the interior of the hollow-cylindrical coil 16. This construction of the magnetic part 12 is typical for the pressure regulating valve 10 with proportional regulating functions. In proportional valves the armature 20 between its end positions is bringable to any intermediate positions, whereby a pressure regulation is constantly regulatable by variation of the control voltage of the coil 16.

In the pressure regulating valve 10 of FIG. 2 the armature 20 is voluminous. It is a rotation-symmetrical component, with collar 20a which covers the coil 16 at the end side. The collar 20a extends in direction of the valve flange 14 into an armature plunger 20b, at whose end the closing member 88 is formed. The collar 20a in direction of the magnetic part 12 transits into an armature dome 20c which is placed inside the coil 16. A blind-hole-shaped central opening 22 is formed in the armature dome 20c and receives the pin 24. The pin 24 on the one hand centers the spring 30 which returns the pressure regulating valve 10 to its base position and on the other hand provides the pin 24 with armature guidance, since the end extending beyond the armature 20 is inserted in the sliding bushing 26 of the plug 28 that closes the coil core 18.

It is to be understood that further changes or additional features are possible without departing from the spirit of the present invention. For example in a pressure regulating valve 10 with pressure medium-free magnetic part 14 a cost favorable damping device 76 can be integrated without increasing the dimensions or the number of the components.

It will be understood that each of the elements described above, or two or more together, may also find a useful application in other types of constructions differing from the types described above.

While the invention has been illustrated and described as embodied in hydraulic pressure regulating valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A hydraulic pressure regulating valve for regulating a pressure in an automatic transmission of a motor vehicle, comprising a magnetic part which includes an electrically controllable coil, a coil core and a movable armature; a valve flange which is anchored on said magnetic part and has pressure medium guiding passages; a piston controlling a pressure in a passage connected to a consumer, said piston being loaded with said armature and controlling pressure medium connections between said passages; a diaphragm element which seals said valve flange relative to said magnetic part; means forming a return passage, said diaphragm element having at least one pressure chamber which is hydraulically connected with said return passage; and a throttling device formed so that said pressure chamber is connected with said return passage through said throttling device.

2. A hydraulic pressure regulating valve as defined in claim 1, wherein said pressure chamber is formed in said valve flange.

3. A hydraulic pressure regulating valve as defined in claim 1, wherein said throttling device is formed by a gap between said piston and a wall of a guiding opening in a region between said pressure chamber and said return passage.

4. A hydraulic pressure regulating valve as defined in claim 1, wherein said throttling device is formed by a connecting passage between said pressure chamber and said return passage.

5. A hydraulic pressure regulating valve as defined in claim 4, wherein said connecting passage has at least one orifice opening which is formed directly on said flange.

6. A hydraulic pressure regulating valve as defined in claim 4, wherein said connecting passage has at least one orifice opening which is formed on a separate hat orifice inserted in said connecting passage.

7. A hydraulic pressure regulating valve as defined in claim 4, wherein said connecting passage opens directly into said return passage of said valve flange.

8. A hydraulic pressure regulating valve as defined in claim 1, wherein said valve flange has at least one connection provided at a supply side, at least one connection provided at a working passage side, and at least one connection provided at a return side, and pressure medium connections between said connections forming a control cross-section, said piston having control edges controlling said control cross-section.

9. A hydraulic pressure regulating valve as defined in claim 1, wherein said valve flange has at least one connection at a supply side, at least one connection at a working passage side, and at least one connection at a return side, pressure medium connections between said connections forming a valve seat; and a closing member which controls said valve seat.

10. A hydraulic pressure regulating valve as defined in claim 1, wherein said coil core and said armature of said magnetic part are inserted at least partially into an interior of said coil for forming a proportional magnet.

11. A hydraulic pressure regulating valve as defined in claim 1, wherein said diaphragm element is mounted on said valve flange and on said piston.

12. A hydraulic pressure regulating valve as defined in claim 1, wherein said diaphragm element is mounted on said magnetic part and said armature.

* * * * *